US008346540B2

(12) United States Patent  (10) Patent No.: US 8,346,540 B2
Grigsby et al.  (45) Date of Patent: Jan. 1, 2013

(54) DEEP TAG CLOUD ASSOCIATED WITH STREAMING MEDIA

(75) Inventors: Travis M. Grigsby, Austin, TX (US); Ruthie D. Lyle, Durham, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/131,994

(22) Filed: Jun. 3, 2008

(65) Prior Publication Data

US 2009/0299725 A1 Dec. 3, 2009

(51) Int. Cl.
  G06F 17/21 (2006.01)
  G06F 17/20 (2006.01)
  G06F 17/27 (2006.01)
(52) U.S. Cl. ............... 704/10; 704/1; 704/9; 704/3
(58) Field of Classification Search ............. 704/1, 9, 704/10; 707/705, E17.102, E17.103
See application file for complete search history.

(56) References Cited

U.S. PATENT DOCUMENTS

| 7,712,125 | B2* | 5/2010 | Herigstad et al. ............. 725/141 |
| 2003/0006999 | A1* | 1/2003 | Carlson et al. ................ 345/713 |
| 2003/0140316 | A1* | 7/2003 | Lakritz ......................... 715/536 |
| 2004/0255321 | A1* | 12/2004 | Matz .............................. 725/14 |
| 2005/0220439 | A1* | 10/2005 | Carton et al. ..................... 386/4 |
| 2006/0248558 | A1* | 11/2006 | Barton et al. ................... 725/46 |
| 2006/0282776 | A1 | 12/2006 | Farmer et al. |
| 2007/0078832 | A1* | 4/2007 | Ott et al. ........................... 707/3 |
| 2007/0078896 | A1* | 4/2007 | Hayashi et al. ............. 707/104.1 |
| 2007/0154190 | A1 | 7/2007 | Gilley et al. |
| 2008/0046925 | A1* | 2/2008 | Lee et al. ........................ 725/37 |
| 2008/0072145 | A1 | 3/2008 | Blanchard et al. |
| 2008/0222105 | A1* | 9/2008 | Matheny ........................... 707/3 |
| 2009/0077062 | A1* | 3/2009 | Spivack et al. .................... 707/5 |
| 2009/0172150 | A1* | 7/2009 | Alkov et al. ................... 709/224 |

FOREIGN PATENT DOCUMENTS

WO WO2007082167 7/2007
WO WO2008060655 5/2008

OTHER PUBLICATIONS

"PCT Application No. PCT/EP2009/056202 International Search Report", Aug. 27, 2009, 10 pages.
Motionbox, "glacier gorge, grindelwald", http://www.motionbox.com/video/player/a09fd8b81128#1,(Oct. 22, 2006).
Waters, Tim "Deep geotagging of videos—Motionbox", *Thinkwhere*, http://web.archive.org/web/20070302083712/http://www.motionbox.com/video/player/a09fd8b81128,(Oct. 22, 2006).

* cited by examiner

*Primary Examiner* — Jesse Pullias
(74) *Attorney, Agent, or Firm* — DeLizio Gilliam, PLLC

(57) ABSTRACT

In some embodiments, a method for providing access to media segments using a tag cloud comprises receiving a request to play streaming media, identifying deep tags associated with the streaming media, and determining preferences of a user based on information provided by the user. The method can also comprise selecting a group of the deep tags based on the information provided by the user and displaying the group of the deep tags in a tag cloud, wherein the deep tags hyperlink to segments within the streaming media. The method can also include presenting, in response to activation of a deep tag in the group, one of the segments within the streaming media.

15 Claims, 7 Drawing Sheets

US 8,346,540 B2

DEEP TAG CLOUD ASSOCIATED WITH STREAMING MEDIA

TECHNICAL FIELD

Embodiments of the inventive subject matter generally relate to the field of web environments, and more particularly, to methods for creating dynamic deep tag clouds for streaming media.

BACKGROUND

Tags and tag clouds have at least two functions: 1) describing web content, and 2) locating web content. In describing content, users can browse through a website and "tag" content that appeals to them (e.g., web pages, pictures, video, etc). In some instances, users upload and tag their own content, so others can find it. To facilitate tagging, websites may provide users with a graphical user interface (GUI) through which they can apply tags to content. In some instances, users can apply multiple tags to the same content and they can post reviews of the content.

SUMMARY

In some embodiments, a method for providing access to media segments using a tag cloud comprises receiving a request to play streaming media, identifying deep tags associated with the streaming media, and determining preferences of a user based on information provided by the user. The method can also comprise selecting a group of the deep tags based on the information provided by the user and displaying the group of the deep tags in a tag cloud, wherein the deep tags hyperlink to segments within the streaming media. The method can also include presenting, in response to activation of a deep tag in the group, one of the segments within the streaming media.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
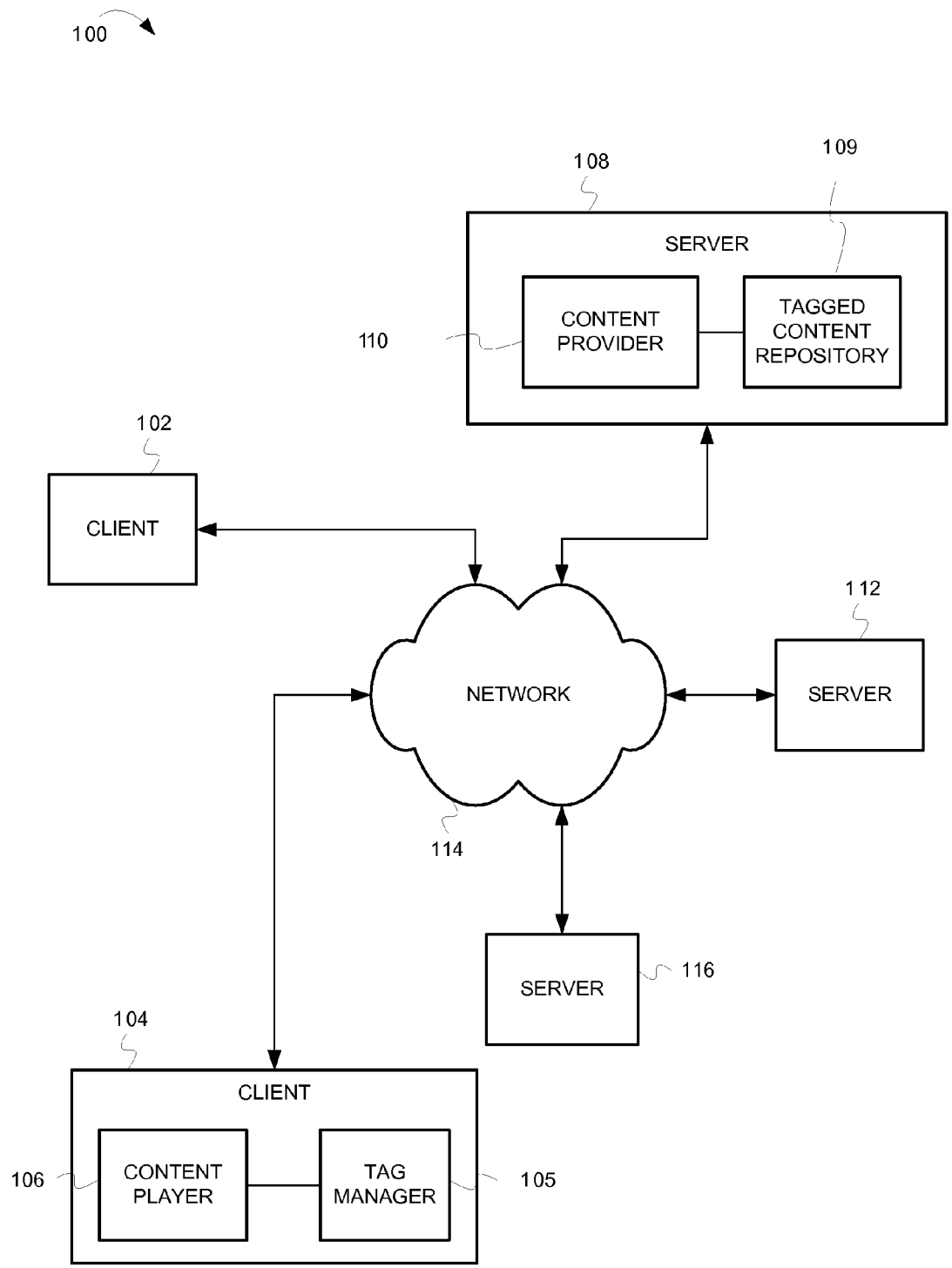
FIG. 1 is a block diagram illustrating a client server system configured to maintain and present deep tags for streaming media, according to some embodiments of the invention.

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Introduction

A tag is a keyword assigned to describe and locate web content (e.g., text, pictures, music, videos, etc). Users browsing through the web can tag content that appeals to them and can also upload and tag their own content, so that others can find it. Websites also use tags to help users locate web content. However, streaming media files (e.g., audio, video) are dynamic in nature. In other words, streaming media files are associated with a time reference. A high level tag (a tag associated with a file as a whole) could refer to different media segments depending on whether the tagger includes a time reference and other information. For example, users may tag a video file to indicate that the video file includes dance moves, clothes, background posters, people, etc. These events can occur at different time instances within the video. Because high level tags cannot reference specific segments within the video file, the high level tags may not lead users directly to content identified by the tags. For example, if a user clicks on a "dance" tag, the high level tag may link to the beginning of a video (without any time reference) and the user may be forced to watch the entire video to find the segment associated with the tag.

Deep tagging is the process of tagging individual segments or sections of audio, video, or any other form of streaming media. In other words, deep tags are tags associated with segments of the streaming media, instead of being associated with the entire file. Users can use deep tags to mark specific events within the steaming media. Deep tags also enable users to locate specific media clips, as clicking on a deep tag leads to a segment within the streaming content. Referring to the example described above, if the taggers use deep tags, users can click on the "dance" deep tag, jump to the exact location in the video associated with the deep tag, and view the relevant video segment.

Although some websites allow users to access deep tags via dropdown menus under video screen areas, by chapters, or by viewing thumbnails of media sections on a time line, such measures may not be enough to help users find desired content. Users may want to view tags based on their preferences (e.g., location, interests), view only their own tags, or view clips tagged by people fitting a certain profile. For example, users may want to view dance video clips tagged by trained dancers, listen to music clips tagged by people who play a musical instrument, etc. Some embodiments of the inventive subject matter enable users to view deep tags relevant to their personal preferences. Some embodiments provide a method for creating and dynamically updating tag clouds including deep tags associated with the streaming media. In some embodiments, the tag clouds dynamically update in sync with the streaming media presentation. That is, some embodiments update the tag cloud based a display position in the streaming media. The discussion below describes these and other important features in detail.

EXAMPLE ARCHITECTURE AND OPERATING ENVIRONMENTS

This section describes example operating environments and provides structural aspects of some embodiments.

Client-Server System

FIG. 1 is a block diagram illustrating a client-server system configured to maintain and present deep tags for streaming media, according to some embodiments of the invention. FIG. 1 describes embodiments in which media files (audio, video, etc) are located on a server and a client plays the media files via a client-server connection.

As shown in FIG. 1, the system 100 includes a server 108 and clients 104. The server 108 includes a content provider 110 and a tagged content repository 109. The content provider 110 includes logic (e.g., software) for displaying a website and its associated streaming media files. The tagged content repository 109 includes deep tags and deep tag information (e.g., tagger's interests, ages, locations, etc.) associated with streaming media files in the tagged content repository 109. In some instances, the deep tags can be embedded in the streaming media, while in other instances, the deep tags can be stored separately.

The clients 104 include a streaming content player 106 and a tag manager 105. In some embodiments, the server 108 enables the client 104 to remotely play streaming media and access deep tags associated with the streaming media. As noted above, deep tags can be embedded in the streaming media or separate from the streaming media. The tag manager 105 and the streaming content player 106 can work together to present deep tags associated with streaming media files.

The tag manager 105 can present windows for displaying electronic questionnaires inquiring about users' interests and preferences. The tag manager 105 can store the users' responses to the questionnaire and use the answers to filter out irrelevant tags. In some embodiments, the tag manager 105 can use deep tags to identify media content and even block streaming content files. For example, schools might configure their system's tag manager to use deep tags to identify content and block media with harmful content.

The tag manager 105 can also interface with the streaming content player 106 to present deep tags. The streaming content player 106 can contain functionality (e.g., natively, in the form of a plug-in, etc.) to recognize deep tags and display them in tag clouds alongside media. Tag clouds typically contain a set of related tags, where the tags can be text, such as keywords, that describe web content. Here, tag clouds provide users with a convenient interface to view and access deep tags associated with streaming content. In some instances, each tag is assigned a weight indicating the tag's popularity (i.e., how often users use the tag to access content). For example, the most popular tags can be prominently displayed in striking colors or bigger fonts. Relevant but less popular tags can be displayed in smaller fonts. The tag manager 105 can display tag clouds on the streaming content player 106, in an external pop up window, in an overlay on the screen, or by other means. In some embodiments, the tag manager 105 can also be a part of the streaming content player 106.

In some embodiments, the server 108 enables the client 104 to add deep tags to streaming media files currently playing in the streaming content player 106. If a user tags a media section, the tag manager 105 can create a file (e.g., XML file) indicating properties such as media filename, username, position of the tag within the media file, time when the file was tagged, address of the PC that tagged the content, etc. The client 104 can send this file to the server 108 via the network 114. On the server 108, the content provider 110 can identify new tags and the associated properties sent by the client 104. The tagged content repository 109 can store the new tag, its location in the media stream, and the properties of the tagger. These tags can now be made available to other users who access the same media files. In some instances, users can tag content and choose to keep their tags private. These private tags are hidden from the other content users and are displayed only to the content tagger.

The servers 108 and the clients 104 are connected to a communication network 114. The network 114 can include any technology suitable for passing communication between the clients and servers (e.g., Ethernet, 802.11n, SONET, etc.). Moreover, the network 114 can be part of other networks, such as cellular telephone networks, public-switched telephone networks (PSTN), cable television networks, etc. Additionally, the servers 108 and clients 104 can be any suitable computing devices capable of executing software in accordance with the embodiments described herein.

Standalone System

Figure 2:
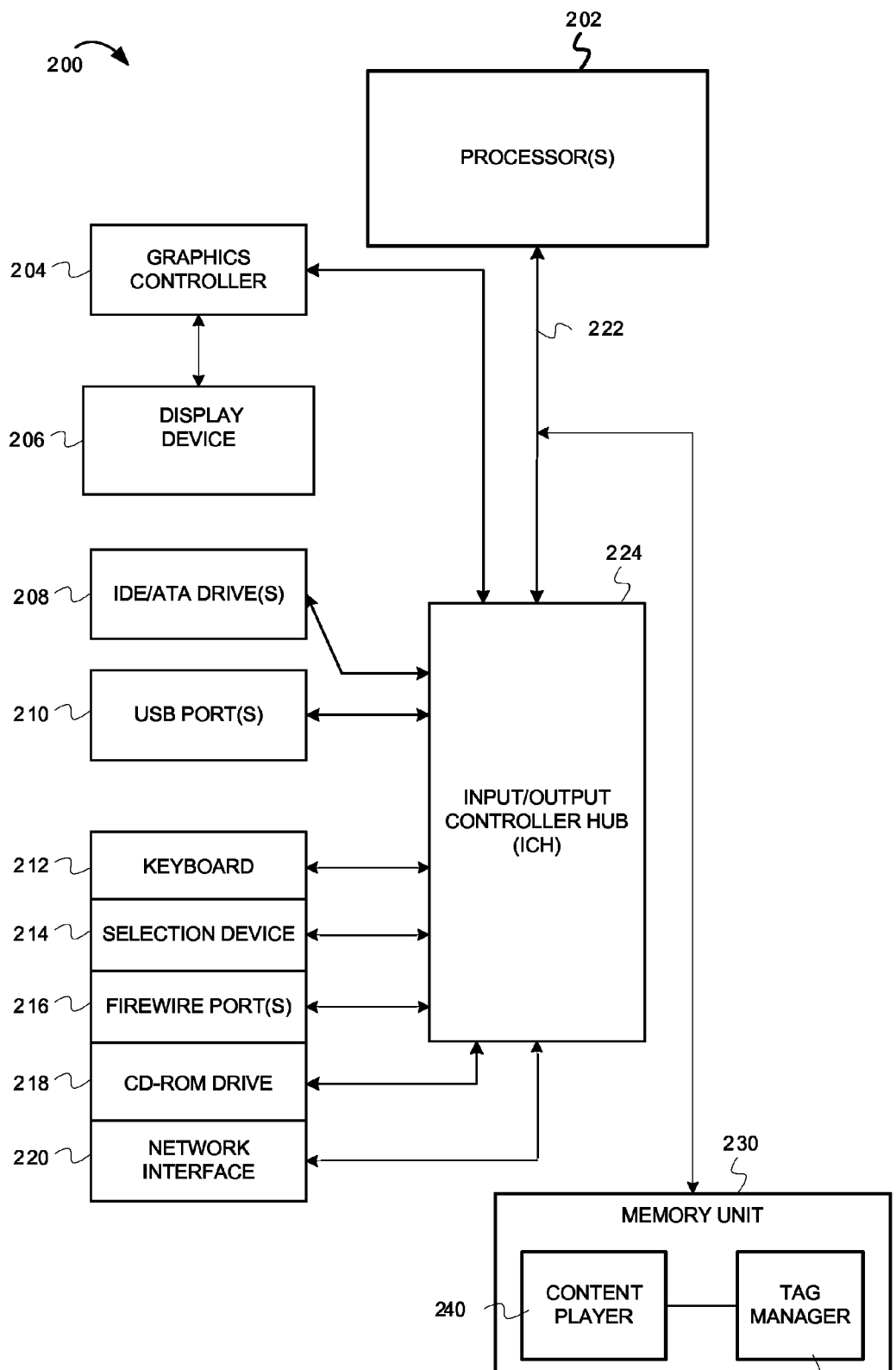
FIG. 2 is a block diagram illustrating a standalone computer system configured to present deep tags in a tag cloud, according to some embodiments of the invention.

FIG. 2 is a block diagram illustrating a standalone computer system configured to present deep tags in a tag cloud, according to some embodiments of the invention. FIG. 2 describes embodiments in which the media files (audio, video, etc.) are located on the client (e.g., having been downloaded from the server) and the tags are embedded in media files.

The computer system 200 includes a processor 202. The processor 202 is connected to an input/output controller hub 224 (ICH) also known as a south bridge. A memory unit 230 interfaces with the processor 202 and the ICH 224. The main memory unit 230 can include any suitable random access memory (RAM), such as static RAM, dynamic RAM, synchronous dynamic RAM, extended data output RAM, etc.

In one embodiment, the memory unit 230 includes a streaming content player 240 and a tag manager 242. The tag manager 242 and the streaming content player 240 work together to display the deep tags associated with streaming media files. In some embodiments, the tag manager 242 identifies tags in streaming media, receives inputs from the user (e.g., interests, age, and other preferences), finds the relevant tags based on the user's preferences, and interfaces with the streaming content player 240 to display these tags along with the media files. The streaming content player 240 contains functionality (e.g., in the form of a plug-in) to recognize the deep tags and present them alongside the media. In some instances, the tag manager 242 can also be a part of the streaming content player 240. In some instances, if the user tags a section of the streaming content, the tag manager 242 can store the tag in a local tag repository (not shown) for further use with the downloaded media file. In other instances, the tag manager 242 can connect to a server (not shown) and request that the new tag be embedded along with other the tags in the original media file.

In some embodiments, one or more of the components may also reside on other forms of machine-readable medium such as floppy diskettes, CD-ROM, magneto-optical storage medium, erasable programmable memory (e.g., EPROM and EEPROM), or other types of medium suitable for storing electronic instructions.

The ICH 224 connects and controls peripheral devices. In FIG. 2, the ICH 224 is connected to IDE/ATA drives 208 (used to connect external storage devices) and to universal serial bus (USB) ports 210. The ICH 224 may also be connected to a keyboard 212, a selection device 214, firewire ports 216 (for use with video equipment), CD-ROM drive 218, and a network interface 220. The ICH 224 can also be connected to a graphics controller 204. The graphics controller is connected to a display device (e.g., monitor).

In some embodiments, the computer system 200 can include additional devices and/or more than one of each component shown in FIG. 2 (e.g., video cards, audio cards, peripheral devices, etc.). For example, in some instances, the computer system 200 may include multiple processors, multiple cores, multiple external CPU's. In other instances, components may even be integrated or subdivided. In addition, embodiments may be embodied in an electrical, optical, acoustical or other form of propagated signal (e.g., carrier waves, infrared signals, digital signals, etc.), or wireline, wireless, or other communications medium.

Any component of the computer system 200 can be implemented as hardware, firmware, and/or machine-readable media including instructions for performing the operations described herein. A machine readable medium includes any mechanism for storing or transmitting information in a form (e.g., software, processing application) readable by a machine (e.g., a computer system). For example, machine-readable media may include read only memory (ROM), random access memory (RAM), magnetic disk storage media, optical storage media, flash memory machines, etc. Machine-readable media also includes any media suitable for transmitting software over a network.

EXAMPLE TAG MANAGER OPERATIONS

This section describes operations associated with some embodiments of the invention. The flow diagrams will be described with reference to the architectural block diagrams presented earlier. However, in some embodiments, the operations can be performed by logic not described in the block diagrams; furthermore, some embodiments can perform more or less than the operations shown in any flow diagram. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel.

Figure 3:
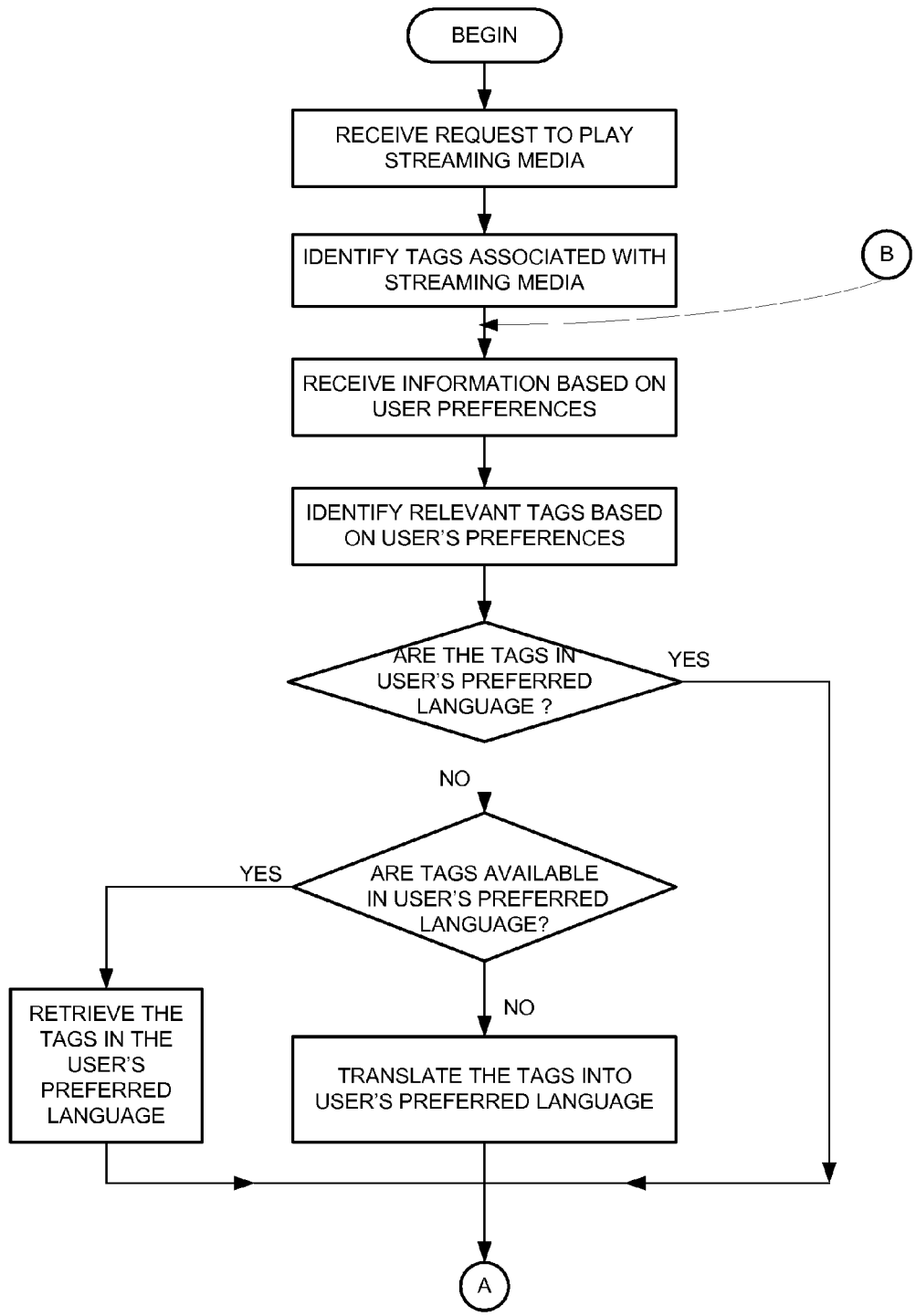
FIG. 3 is a flow diagram illustrating the operations for identifying relevant tags and translating them into a specified language, according to some embodiments of the invention.

FIG. 3 is a flow diagram illustrating the operations for identifying relevant tags and translating them into a specified language, according to some embodiments of the invention. The following discussion will describe the flow 300 with reference to the client-server system of FIG. 1. The flow 300 begins at block 302.

At block 302, a tag manager 105 receives a request to play streaming media. This request can be in response to a user clicking on a website's media link or opening a media file in a desktop streaming content player 106. The tag manager 105 can detect requests by receiving communications from the streaming content player 106, by monitoring user actions in the content player 106, or by other means. The flow continues at block 304.

At block 304, the tag manager 105 identifies tags associated with the streaming media. In some instances, the tags may be embedded in the media stream. The tag manager 105 can identify tags and extract the tags from the streaming media to help the streaming content player 106 display them in a suitable tag cloud format. In other instances, the tags may be stored in a tagged content repository 109 on the server. The tag manager 105 can send a request to the server requesting tags associated with a specified media file. After the tag manager 105 procures the tags associated with the streaming media file, the flow continues at block 306.

At block 306, the tag manager 105 receives information indicating the user's preferences. In some instances, the tag manager 105 can trigger a new window and prompt the user to fill out an electronic questionnaire indicating the user's interests and preferences. For example, the user may enter an update interval and a preferred display language. The update interval specifies how often the deep tags in the tag cloud are updated. Additionally, the user may also provide profile information such as age, location, interests, etc. to help the tag manager 105 identify and present the most relevant tags. In some instances, the tag manager 105 can filter tags based on the tagger's profile and interests. Block 306 is denoted as entry point 'B' for use in subsequent figures. The flow continues at block 308, after the tag manager 105 receives the user's profile information.

At block 308, the tag manager 105 identifies the relevant tags from the pool of tags associated with the media file. The tag manager 105 filters the tags based on the user's preferences (age, location, interests, etc.), the tagger's profile (e.g., tagger's interests, age, etc.), and any other relevant information. For example, if the user is watching a video of a classical music concert, the user may want to view tags from people who have a formal education in music or who play a musical instrument. As another example, when watching a music video, a user may want to view clips tagged by dancers indicating interesting dance moves. The tag manager 105 can use this user input to filter irrelevant tags and present only relevant deep tags. After the tag manager 105 identifies the relevant tags, the flow continues at block 310.

At block 310, the tag manager 105 determines the user's preferred display language and determines whether the relevant tags are in the user's preferred language. Because content can be streamed in many different languages, the tag manager 105 can include some additional logic to switch between different languages. The tag manager 105 can toggle between languages based on the user's input. Users can change their preferred language at any time and the tag manager 105 dynamically modifies the tags to cater to the users' preferences. In some instances, the tag manager 105 can specifically search for tags in the user's language. In other instances, the tag manager 105 can translate the tags into the user's specified language. If the tags are in the same language as the user's preferred display language, the flow continues at entry point 'A' (FIG. 4 or FIG. 5), where the relevant tags are displayed in a tag cloud on the streaming content player. Otherwise, the flow continues at block 312.

At block 312, the tag manager 105 determines whether tags are available in the user's preferred display language. For example, suppose that the user changes the display language from English to Spanish. The tag manager 105 can determine whether it extracted any Spanish tags from the media stream. Alternately, the tag manager 105 can also query the server 108 to determine whether there are Spanish tags for the specified media file in the tagged content repository 109. In turn, the server 108 can reply to this query by sending Spanish tags (e.g., in an XML file) or by sending message indicating that no Spanish tags were found. If tags are available in the user's preferred display language, the flow continues at block 314. Otherwise, the flow continues at block 316.

At block 314, the tag manager 105 retrieves the tags in the user's preferred display language. In some instances, the tag manager 105 can procure these tags from a repository on the server 108 or from a repository of media-extracted tags (not shown) on the client 104. The flow continues at entry point 'A' (FIG. 4 or FIG. 5) where the tag manager 105 presents the relevant in a tag cloud.

At block 316, the tag manager 105 translates the tags into the user's preferred language. The tag manager 105 performs this operation if it cannot find any tags in the user's preferred display language. The tag manager 105 translates the tags in real time and dynamically updates the tags on the streaming content player's display. The tag manager 105 can translate the tags using a separate dictionary (e.g., present on the client 104) or using an inbuilt dictionary. In some instances, the tag manager 105 can connect to an online dictionary, translation website, or translation component on the server 108 to convert the tags from their original language into the user's preferred display language. The tag manager 105 can then interface with the streaming content player 106 to present these tags in a tag cloud on the streaming content player. The flow continues at entry point 'A' (FIG. 4 or FIG. 5).

Entry point 'A' denotes the point in the flow which can lead to any one of two distinct flows. In one embodiment, the tag manager displays one dynamic tag cloud for user navigation in the streaming content (described in FIG. 4). In another embodiment, the tag manager splits the tag cloud into two tag clouds showing 'Already seen/Coming up' cumulative tag cloud views (described in FIG. 5).

The sequence of operations described in FIG. 3 can also be performed by the embodiment described in FIG. 2, where the streaming content player plays media files present locally on the same machine.

Figure 4:
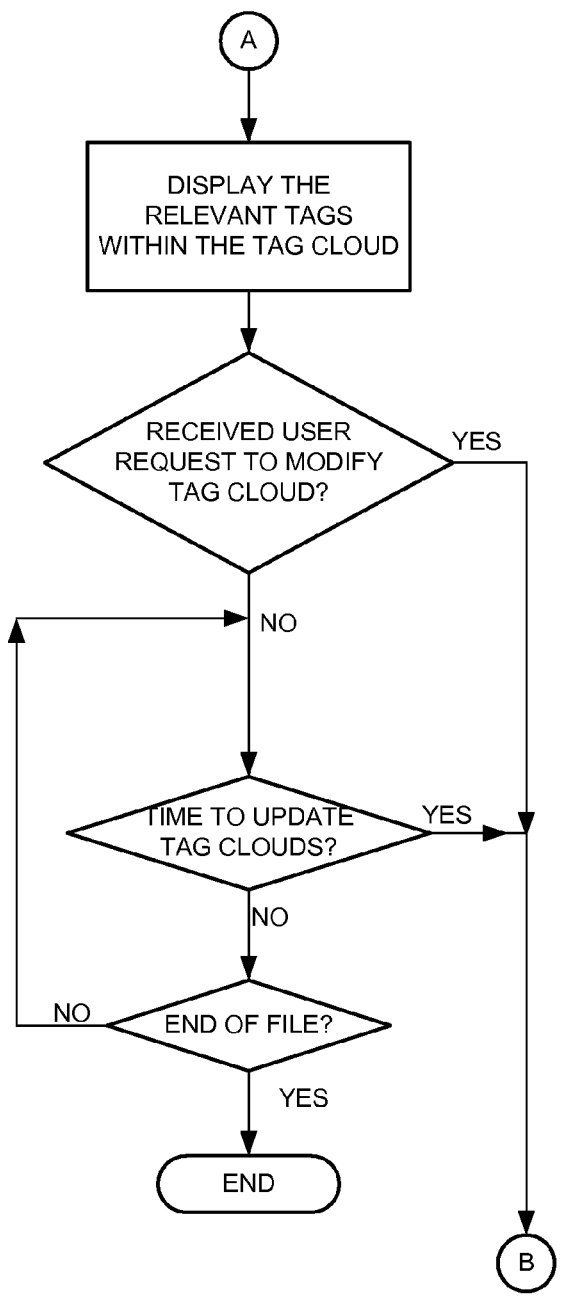
FIG. 4 is a flow diagram illustrating the operations for presenting the relevant tags and updating a single tag cloud, according to some embodiments of the invention.
Figure 5:
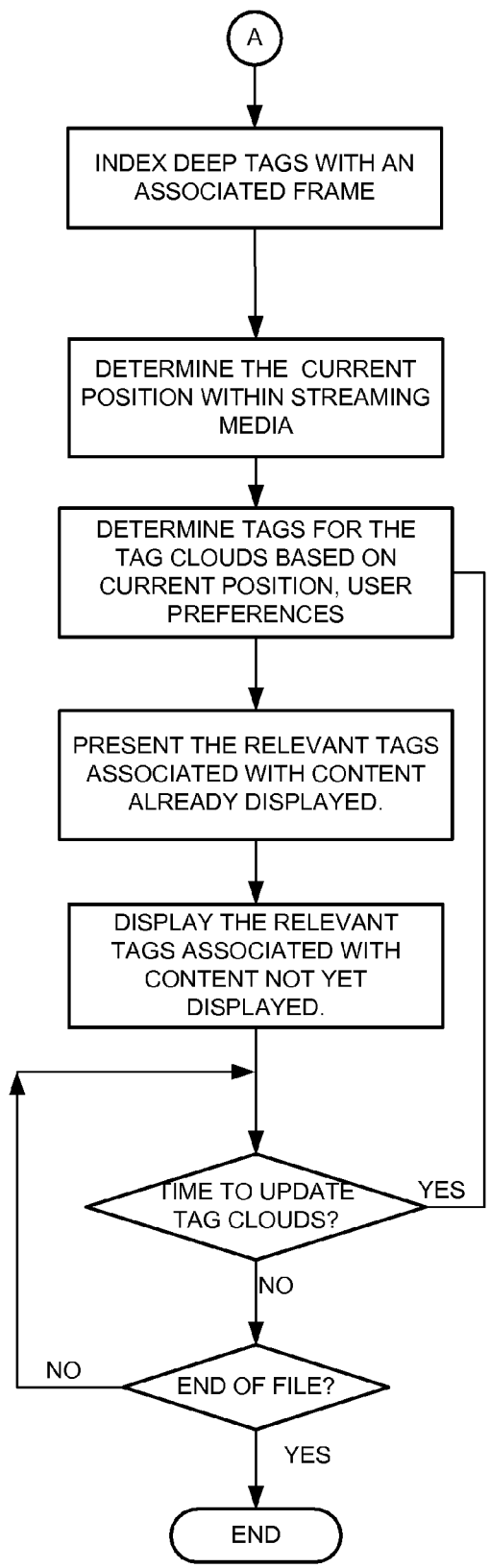
FIG. 5 is a flow diagram illustrating the operations for creating and presenting two cumulative tag cloud views, according to some embodiments of the invention.

FIG. 4 is a flow diagram illustrating the operations for presenting the relevant tags and updating a single tag cloud, according to some embodiments of the invention. The following discussion will describe the flow 400 with reference to the client-server system of FIG. 1. The flow 400 begins at entry point 'A' (from FIG. 3) and moves to block 402.

At block 402, a tag manager 105 displays relevant tags in a tag cloud. The presentation of the tag cloud can be in a transparent overlay that dynamically updates as the streaming content is displayed. In some instances, the tag manager 105 presents the tag cloud via a pop up mechanism or in a fly out menu. The tag manager 105 can present the tag cloud in response to a user's request and can hide the tag cloud when it is not in use. In some instances, the tag cloud can be a permanent fixture on a streaming content player's display. In some embodiments, the tag manager 105 can assign different colors, fonts, font sizes, and other special effects to categorize tags based on popularity and user interests. For example, the tag manager 105 may highlight relevant tags, increase the font size and change the color of the relevant tags, assign different colors and different fonts to tags based on the user's preferences, etc. After the tag manager 105 displays the relevant tags, the flow continues at block 404.

At block 404, the tag manager 105 determines whether it has received a user request to modify the tag cloud. Because the tag cloud display is based on user customizable parameters, the tag manager 105 can interface with the streaming content player 106 to display the same set of tags differently for a different set of parameters. For example, users can change their display language, the tag cloud refresh rate, their interests, or other preference information. If the tag manager 105 determines that the tag cloud must be modified to account for a change in the user's preferences, the flow continues at entry point 'B' (block 306 in FIG. 3), where the tag manager updates the user's preferences, identifies relevant tags, translates the tags into a specified language (if necessary), and interfaces with the streaming content player to present the relevant tags in a tag cloud. Otherwise, the flow continues at block 406.

At block 406, the tag manager 105 determines whether it is time to update the tag cloud. The tag manager 105 can update the tag cloud in sync with the streaming content. The frequency of the tag cloud update depends on a user specified update interval. When it is time to update the tag cloud, the tag manager 105 retrieves the tags for the next set of media frames (e.g., from the server, from the streaming media, etc.) and interfaces with the streaming content player 106 to update and display the new set of deep tags in the tag cloud using any one of the presentation techniques described earlier. The update interval can also influence the content of the tag cloud. For example, a longer update interval results in a larger tag cloud with more tags; while a shorter update interval results in a smaller tag cloud with fewer tags. If the tag manager 105 determines that it is time to update the tag cloud, then the flow continues at entry point 'B' (block 306 in FIG. 3). Otherwise, the flow continues at block 408.

At block 408, the tag manager 105 determines whether it has reached the end of the media file. The tag manager 105 can determine when the content player 106 has reached the end of the media file by monitoring the streaming content player 106, receiving communications from the streaming content player 106, or by other means. If the media file is at an end, the tag manager 105 stops processing tags and the flow ends. Otherwise, the flow continues at block 404. The tag manager 105 can repeat this process until it receives a user request to modify the tag cloud, until it is time to automatically update the tag cloud, or until the media file reaches the end.

From entry point 'B', the flow continues at block 306 in FIG. 3, where the tag manager 105 checks the user's preferences, determines whether they have been changed since the last update, and identifies relevant tags associated with the subsequent frames based on the user's preferences. The tag manager 105 can also translate these tags into the user's preferred display language if tags in the specified language are unavailable. The tag manager 105 displays these tags in a tag cloud on the user's streaming content player 106. The flow of operations described in FIG. 3 and FIG. 4 continues until the end of the media file is reached.

The sequence of operations described in FIG. 4 can also be performed by the embodiment described in FIG. 2, where the content player plays media files present locally on the same machine.

Two Cumulative Tag Clouds

FIG. 5 is a flow diagram illustrating the operations for creating and presenting two cumulative tag cloud views, according to some embodiments of the invention. In some embodiments, the tag manager 105 creates two tag clouds—one to present tags for media sections that have already been viewed and another to display tags for media sections that are coming up. For example, suppose that the first ten minutes of a video are funny and the remaining 80 minutes are not. Initially, the "coming up" tag cloud may show a "funny" tag in bold letters. As time progresses and the tag clouds are updated, the "funny" tag may become smaller and smaller in size. Finally after ten minutes, the "funny" tag disappears from the "coming up" tag cloud and is now displayed in the "already seen" tag cloud. This will tell the user that the rest of the video is not funny. As a result, the user may choose to turn off the video.

Figure 6:
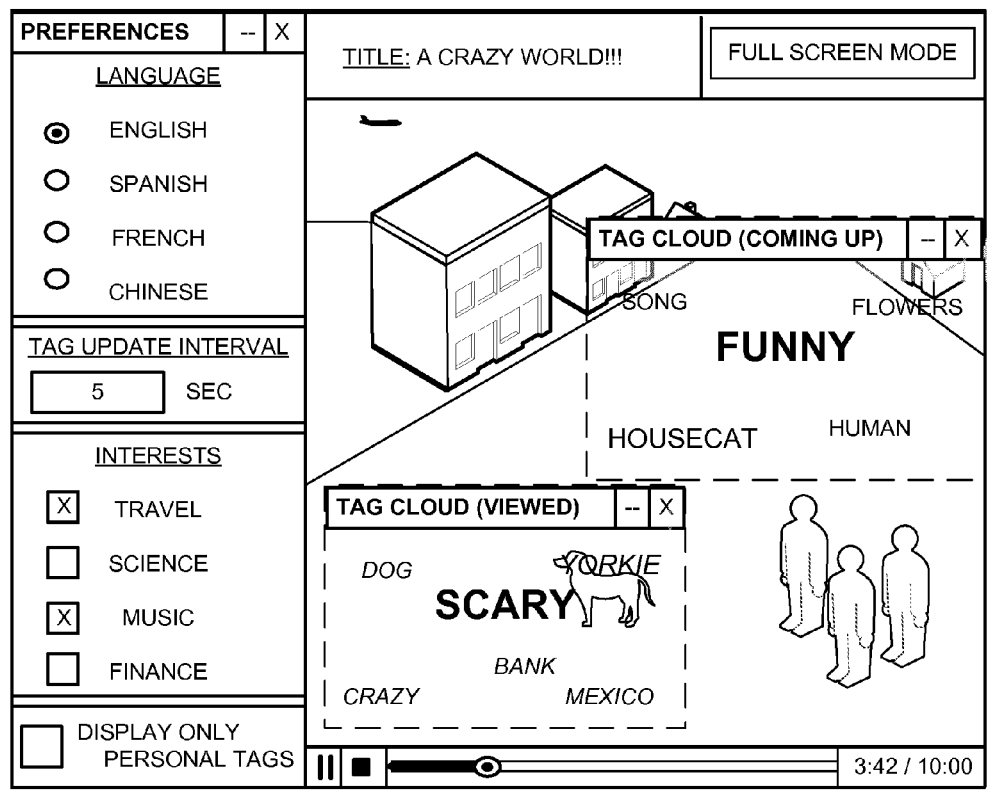
FIG. 6 is a conceptual diagram showing an example screen shot along with various features associated with displaying deep tags, according to some embodiments of the invention.

FIG. 6 further illustrates the concept of using two tag clouds to display and access deep tags within the streaming content. FIG. 6 is a conceptual diagram showing an example screen shot along with various features associated with displaying deep tags, according to some embodiments of the invention. The following discussion will describe the flow 500 with reference to FIG. 6 and the client-server system of FIG. 1. The flow 500 begins at block 502, and is another flow starting at entry point 'A' (FIG. 3).

At block 502, a tag manager 105 accesses all the deep tags and the tag information (e.g., tagger's interests, tagger's age, etc.) associated with the streaming content and indexes the deep tags with portions (e.g., video frames, audio segments, etc.) of the media. In turn, the tag manager 105 can create tag clouds for "already seen" and "coming up" tag cloud views. The flow continues at block 504.

At block 504, the tag manager 105 determines the current position within the streaming media. In some embodiments, to display two tag clouds with deep tags corresponding to "already seen" and "coming up" media sections, the tag manager 105 must know the current position of the streaming content player 106 within the media file. This will also make dynamically updating the tag clouds a more efficient process. Knowing the current position in the media stream, the tag manager 105 can determine tags associated with the previous and subsequent media sections and (later) display them in the two tag clouds. The flow continues at block 506.

At block 506, the tag manager 105 identifies relevant tags for the two tag clouds based on the position of the media pointer within the streaming media. The tag manager 105 can also identify relevant tags based on properties such as the user's age and interests, the tagger's profile, etc. The tag manager 105 can compare the user's preferences with the properties associated with the deep tags and identify the most relevant tags. As shown in FIG. 6, users can choose a preferred display language from a list of languages, select their interests, and enter a tag cloud update interval. As shown in the screen shot 600, users also have an option to display only their personal tags (private tags). Referring back to FIG. 5, after the tag manager 105 identifies the relevant tags, the flow continues at block 508.

At block 508, the tag manager 105 interfaces with the streaming content player 106 to present the relevant tags associated with the already displayed content. As described earlier, the tag manager 105 can display the tag cloud in a transparent overlay, via a pop up mechanism, or in a fly out menu. The tag manager can also present the tag cloud upon the user's request and hide the tag cloud when not in use. In some instances, the tag cloud can be a permanent fixture on the streaming content player's display. The flow continues at block 510.

At block 510, the tag manager 105 interfaces with the streaming content player 106 to display the relevant tags associated with the content not yet displayed. The tag manager 105 can display this tag cloud using one of the presentation techniques described earlier. In some instances, the deep tags in the two related tag clouds can be displayed simultaneously using different fonts, colors, font sizes, and other special effects. For example, the tag manager 105 can interface with the streaming content player 106 to display tags in different colors depending on whether they have already been viewed. Tags can be also displayed with a gradient fill to indicate how much of the tag is still to come. In some instances, each tag can be overlaid with a small line graph with the tags on the Y-axis and the time scale on the X-axis. FIG. 6 shows two tag clouds presented using a transparent overlay. In each tag cloud, the most popular tag is displayed in a bigger font and is in the center of the tag cloud. The other relevant but less popular tags surround the main tag and are in a smaller font. The deep tags in the two tag clouds are also displayed using different formats. The tags in the "already viewed" tag cloud are underlined and italicized. Referring back to FIG. 5, the flow continues at block 512.

At block 512, the tag manager 105 determines whether it is time to update the tag clouds. The frequency of update depends on the update interval specified by the user. For example, if the user specifies a 5 second tag update interval (FIG. 6), the tag manager 105 updates the tag clouds each time the streaming content player 106 presents five seconds of media. Also, in order to update the two tag clouds, the tag manager 105 may need to know the current position of the media player within the streaming content. The tag update interval can affect the size of the tag clouds and the number of tags displayed within the tag clouds. If the tag manager 105 determines that it is time to update the tag cloud, the flow continues at block 504. Otherwise, the flow continues at block 514.

At block 514, the tag manager 105 determines whether the end of the media file has been reached. The tag manager can determine this by monitoring the streaming content player 106, receiving communications from the streaming content player 106, or by other means. If the streaming content player 106 is at the end of the media file, the operation of the tag manager comes to a halt and the flow ends. Otherwise, the flow continues at block 512. In the dual tag cloud embodiments, the flow of operations described in FIG. 3 and FIG. 5 can continue until the content player reaches the end of the media file.

In some embodiments, the sequence of operations described in FIG. 5 can also be performed by the embodiment described in FIG. 2, where the streaming content player plays media content stored locally on the same machine.

Jump to View Mode

Figure 7:
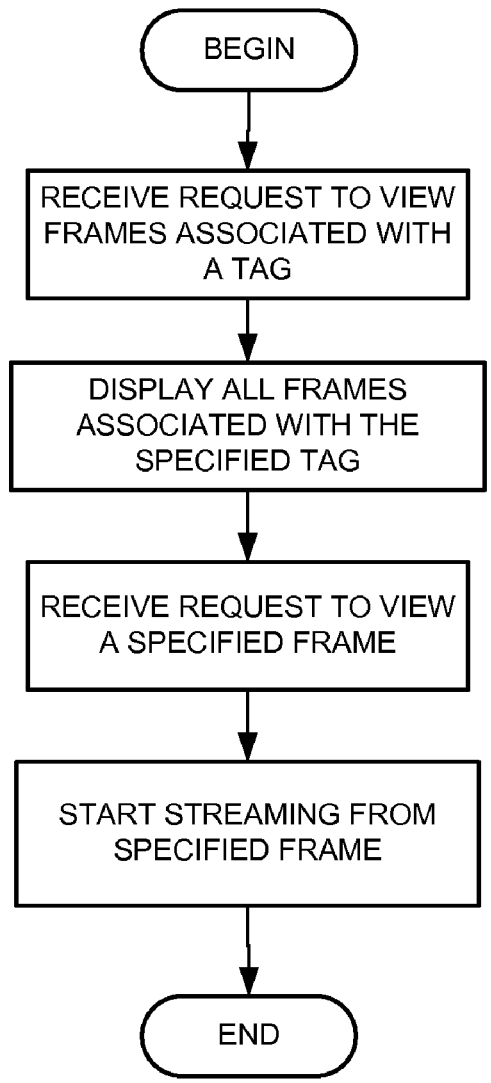
FIG. 7 is a flow diagram illustrating the operations for accessing and presenting all the frames associated with a specified deep tag, according to some embodiments of the invention.

FIG. 7 is a flow diagram illustrating the operations for accessing and displaying all the frames associated with a specified deep tag according to some embodiments of the invention. This "jump to view" functionality can be incorporated along with the single tag cloud embodiments (FIG. 4) and/or the dual tag cloud embodiments (FIG. 5). The following discussion will describe the flow 700 with reference to the client-server system of FIG. 1. The flow 700 starts at block 702.

At block 702, the tag manager 105 receives a request to view frames associated with a specific tag. For example, the user may currently be viewing a frame that someone tagged as "scary" and may want to see other such scary frames. When the user enables the jump to view mode and clicks on the "scary" tag, the streaming content player 106 can pass this request to the tag manager 105. The flow continues at block 704.

At block 704, the tag manager 105 facilitates display of the frames associated with the specific tag. In some embodiments, the tag manager 105 can temporarily store all the tags associated with the media file by downloading them from the server 108 or by extracting them from the media stream. The tag manager 105 can then index the tags on a frame by frame basis (before the streaming content player starts presenting the content). When the user selects a particular deep tag, the streaming content player 106 can relay this request to the tag manager 105. The tag manager 105, in turn, can locate frames associated with the tag. The tag manager 105 can display the frames to the user via the streaming content player 106. The frames can be displayed in a pop up window, in a sidebar alongside the media, or by other means. The flow continues at block 706.

At block 706, the tag manager 105 receives a request to display the media beginning at a specific frame associated with the tag. After all the frames associated with a specified tag are presented on the streaming content player's display, the user can browse through the frames and click on a particular frame, requesting to display the media. After the user selects a frame, the flow continues at block 708.

At block 708, the tag manager 105 determines the location of the frame within the media file. The tag manager 105 can interface with the streaming content player 106 and restart the media stream from the user's specified frame. In some instances, the stream can also be started a few seconds before the specified frame to provide additional context to the media and to help the viewer better understand the media content. The flow for the jump to view mode then ends.

The sequence of operations described in FIG. 7 can also be performed by the embodiment described in FIG. 2, where the streaming content player plays media content present locally on the same machine.

CONCLUSION

While the embodiments are described with reference to various implementations and exploitations, it is understood that these embodiments are illustrative and that the scope of the inventive subject matter is not limited to them. In general, techniques for using dynamic tag clouds for deep tag navigation in the streaming content are described herein and may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting, using an electronic device, a request for deep tags associated with a media file;
    identifying, using the electronic device and based on information provided by a user, the deep tags associated with the media file, wherein each deep tag identifies a position in the media file;
    presenting, using the electronic device, the deep tags in a first tag cloud;
    presenting a portion of the media file using the electronic device, the presentation beginning at a position identified by one of the deep tags;
    dividing, using the electronic device, the deep tags into a first group and a second group, wherein the first group includes ones of the deep tags associated with content not yet presented, and wherein the second group includes ones of the deep tags associated with content that has already been presented; and
    presenting, using the electronic device, the first group in the first tag cloud and the second group in a second tag cloud.

2. The method of claim 1, further including:
    updating the first and second tag clouds in sync with presentation of the streaming media file.

3. The method of claim 1, further including:
    translating the deep tags into a language indicated by preferences of the user.

4. The method of claim 1, further comprising:
    displaying frames of the media file, wherein the frames are associated with one of the deep tags;
    presenting, in response to activation of one of the frames, a segment of media file.

5. The method of claim 1, wherein the deep tags are embedded in the media file.

6. A system comprising:
    a content provider including logic for displaying websites and streaming media files;
    a tagged content repository including deep tags and deep tag related information;
    a streaming content player for playing streaming media files;
    a tag manager configured to detect a request for deep tags associated with a media file,
        identify, based on information provided by a user, the deep tags associated with the media file, wherein each deep tag identifies a position in the media file,
        present the deep tags in a first tag cloud,
        present a portion of the media file, the presentation beginning at a position identified by one of the deep tags,
        divide the deep tags into a first group and a second group, wherein the first group includes ones of the deep tags associated with content not yet presented, and wherein the second group includes ones of the deep tags associated with content that has already been presented, and
        present the first group in the first tag cloud and the second group in a second tag cloud; and
    a processor coupled with the content provider, the tagged content repository, the streaming content player, and the tag manager.

7. The system of claim 6, further including:
    the tag manager configured to update the first and second tag clouds in sync with presentation of the streaming media files.

8. The system of claim 6, further including:
    the tag manager configured to translate the deep tags into a language indicated by preferences of the user.

9. The system of claim 6, further comprising:
    the tag manager configured to display frames of the media file, wherein the frames are associated with one of the deep tags and present, in response to activation of one of the frames, a segment of the media file.

10. The system of claim 6 wherein the deep tags are embedded in the media file.

11. One or more machine-readable storage devices having stored thereon a program product, which when executed on a set of one or more processor units causes the set of one or more processor units to perform operations that comprise:
    detecting a request for deep tags associated with a media file;
    identifying, based on information provided by a user, the deep tags associated with the media file, wherein each deep tag identifies a position in the media file;
    presenting the deep tags in a first tag cloud;

presenting a portion of the media file, the presentation beginning at a position identified by one of the deep tags;

dividing the deep tags into a first group and a second group, wherein the first group includes ones of the deep tags associated with content not yet presented, and wherein the second group includes ones of the deep tags associated with content that has already been presented; and presenting the first group in the first tag cloud and the second group in a second tag cloud.

12. The one or more machine-readable storage devices of claim 11, the operations further including:

updating the first and second tag clouds in sync with presentation of the media file.

13. The one or more machine-readable storage devices of claim 11, the operations further including:

translating the deep tags into a language indicated by preferences of the user.

14. The one or more machine-readable storage devices of claim 11, the operations further comprising:

displaying frames of the media file, wherein the frames are associated with one of the deep tags;

presenting, in response to activation of one of the frames, a segment of the media file.

15. The one or more machine-readable storage devices of claim 11, wherein the deep tags are embedded in the media file.

* * * * *